United States Patent
Tie et al.

(10) Patent No.: US 11,265,921 B2
(45) Date of Patent: Mar. 1, 2022

(54) METHOD AND APPARATUS FOR NON-CONTENTION BASED RANDOM ACCESS

(71) Applicant: Huawei Technologies Co., Ltd., Shenzhen (CN)

(72) Inventors: Xiaolei Tie, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/749,768

(22) Filed: Jan. 22, 2020

(65) Prior Publication Data

US 2020/0178309 A1 Jun. 4, 2020

Related U.S. Application Data

(63) Continuation of application No. PCT/CN2019/075968, filed on Feb. 22, 2019.

(30) Foreign Application Priority Data

Feb. 24, 2018 (CN) .......................... 201810157530.5

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0051* (2013.01); *H04L 5/10* (2013.01);
(Continued)

(58) Field of Classification Search
CPC .......... H04W 74/0833; H04W 74/006; H04W 74/02; H04W 56/001; H04W 72/046; H04L 5/0051; H04L 5/10
(Continued)

(56) References Cited

U.S. PATENT DOCUMENTS 10,512,075 B2 * 12/2019 John Wilson ..... H04W 72/0406
10,779,252 B2 * 9/2020 Park ...................... H04L 5/0032
(Continued)

FOREIGN PATENT DOCUMENTS

CN 101873707 A 10/2010
CN 104185293 A 12/2014
(Continued)

OTHER PUBLICATIONS

U.S. Appl. No. 62/558,895P (provisional application) (Year: 2017).*
(Continued)

*Primary Examiner* — Yemane Mesfin
*Assistant Examiner* — Intekhaab A Siddiquee
(74) *Attorney, Agent, or Firm* — Slater Matsil, LLP

(57) ABSTRACT

A method for non-contention based random access is provided, including: receiving a PDCCH order through a first demodulation reference signal DM-RS port, where the PDCCH order includes a first SSB index, and the PDCCH order is used to instruct to perform random access on a first RACH resource corresponding to the first SSB index by using a first preamble; sending, based on the PDCCH order, an MSG 1 on the first RACH resource by using the first preamble; and determining, based on the first DM-RS port, to receive an MSG 2 through a second DM-RS port, where the second DM-RS port has a QCL relationship with the first DM-RS port.

32 Claims, 6 Drawing Sheets

(51) Int. Cl.
  *H04L 5/10* (2006.01)
  *H04W 56/00* (2009.01)
  *H04W 72/04* (2009.01)
  *H04W 74/00* (2009.01)
  *H04W 74/02* (2009.01)

(52) U.S. Cl.
  CPC ....... *H04W 56/001* (2013.01); *H04W 72/046* (2013.01); *H04W 74/006* (2013.01); *H04W 74/02* (2013.01)

(58) Field of Classification Search
  USPC .......................................................... 370/329
  See application file for complete search history.

(56) References Cited

U.S. PATENT DOCUMENTS

| | | | |
|---|---|---|---|
| 2015/0249972 A1 | 9/2015 | You et al. | |
| 2019/0082471 A1* | 3/2019 | Tsai | H04L 5/0048 |
| 2019/0132871 A1* | 5/2019 | Suzuki | H04W 74/0808 |
| 2019/0379431 A1* | 12/2019 | Park | H04L 5/00 |

FOREIGN PATENT DOCUMENTS

| | | |
|---|---|---|
| CN | 107534538 A | 1/2018 |
| WO | 2016149167 A1 | 9/2016 |
| WO | 2017183309 A1 | 10/2017 |
| WO | 2018024027 A1 | 2/2018 |
| WO | 2019052472 A1 | 3/2019 |
| WO | 2019158127 A1 | 8/2019 |

OTHER PUBLICATIONS

U.S. Appl. No. 62/557,199P (Provisional application) (Year: 2017).*
U.S. Appl. No. 62/543,836P (Year: 2017).*
U.S. Appl. No. 62/543,839P (Year: 2017).*
U.S. Appl. No. 62/543,841P (Year: 2017).*
U.S. Appl. No. 62/543,847P (Year: 2017).*
Folke, M., "LS on PDCCH order for initiation of random access", 3GPP TSG-RAN WG1 #AH-1801, R1-1801073, Jan. 22-26, 2018, 2 pages, Vancouver, Canada.
Zte, Sanechips, "Remaining details of RACH procedure", 3GPP TSG RAN WG1 Meeting #92, R1-1801410, Feb. 17, 2018, 12 pages, Athens, Greece.
3rd Generation Partnership Project; Technical Specification Group Radio Access Network; Study on Non-Orthogonal Multiple Access (NOMA) for NR (Release 15), 3GPP TR 38.812, 1(Feb. 2018), 9 pages, V0.0.0.
Sharp, "Remaining issues on RACH procedure", 3GPP TSG RAN WG1 Meeting #92, R1-1802661, Feb. 17, 2018, pages, Athens, Greece.
Huawei, HiSilicon, "Remaining details of RACH Procedures", 3GPP TSG RAN WG1 Meeting #92, R1-1801331, Feb. 17, 2018, 5 pages, Athens, Greece.
3rd Generation Partnership Project; Technical Specification Group Radio Access Network; NR; Physical layer procedures for data (Release 15), 3GPP TS 38.214, (Dec. 2017), 71 pages, V15.0.0.
3rd Generation Partnership Project; Technical Specification Group Radio Access Network; NR; Physical layer procedures for control (Release 15), 3GPP TS 38.213, (Dec. 2017), 56 pages, V15.0.0.
3rd Generation Partnership Project; Technical Specification Group Radio Access Network; NR; Multiplexing and channel coding (Release 15), 3GPP TS 38.212, (Dec. 2017), 82 pages, V15.0.0.
3rd Generation Partnership Project; Technical Specification Group Radio Access Network; NR; Physical channels and modulation (Release 15), 3GPP TS 38.211, (Dec. 2017), 73 pages, V15.0.0.
MediaTek Inc., "Remaining details on RACH procedure", 3GPP TSG RAN WG1 Meeting #92, R1-1801660, February 26-Mar. 2, 2018, 11 pages, Athens, Greece.
3GPP TS 38.321 V15.0.0 (Dec. 2017); 3rd Generation Partnership Project; Technical Specification Group Radio Access Network; NR;Medium Access Control (MAC) protocol specification (Release 15); 55 pages.
3GPP TS 38.331 V15.0.0 (Dec. 2017), 3rd Generation Partnership Project; Technical Specification Group Radio Access Network NR Radio Resource Control (RRC) protocol specification (Release 15), 188 pages.
Interdigital et al.: "Aspects related to Supplementary Uplink", 3GPP TSG RAN WG1 Meeting AH1801, R1-1800605, Vancouver, Canada, Jan. 22-26, 2018, 5 pages.
Interdigital et al.: "RACH procedure on SUL", 3GPP TSG RAN WG1 Meeting #92, R1-1802570, Athens, Greece, Feb. 26-Mar. 2, 2018, 3 pages.
Folke, M., "LS on PDCCH order for initiation of random access", 3GPP TSG-RAN WG1 #AH-1801, R1-1801073, Jan. 22-26, 2018, 2 pages, Vancouver, Canada.
Media Tek Inc.: "Remaining details on RACH procedure", 3GPP TSG RAN WG1 Meeting #92, R1-1801660, Athens, Greece, Feb. 26-Mar. 2, 2018, 11 pages.

* cited by examiner

METHOD AND APPARATUS FOR NON-CONTENTION BASED RANDOM ACCESS

CROSS-REFERENCE TO RELATED APPLICATIONS

This application is a continuation of International Application No. PCT/CN2019/075968, filed on Feb. 22, 2019, which claims priority to Chinese Patent Application No. 201810157530.5, filed on Feb. 24, 2018. The disclosures of the aforementioned applications are hereby incorporated by reference in their entireties.

TECHNICAL FIELD

This application relates to the wireless communications field, and in particular, to a method and an apparatus for non-contention based random access.

BACKGROUND

In some scenarios of a wireless communications system, for example, in a cell handover scenario, a scenario in which a terminal device is out of synchronization when downlink data arrives at the terminal device, or an assistive positioning scenario, the terminal device needs to perform non-contention based random access to maintain normal communication between the terminal device and a network device. For example, if the network device determines that the terminal device needs to perform non-contention based random access, the network device uses a physical downlink control channel (PDCCH) order to instruct the terminal device to send a message 1 (MSG 1) on a specified random access channel (RACH) resource by using a specified preamble, and indicate a synchronization signal block (SSB) index. A beam corresponding to the SSB index has a quasi co-location (QCL) relationship with a beam on which the network device sends a message 2 (MSG 2) subsequently. In other words, the PDCCH order is used to trigger a non-contention based random access procedure, and the terminal device sends the MSG 1 based on the PDCCH order. The MSG 1 corresponds to a physical random access channel (PRACH) at a physical layer.

When the wireless communications system uses high frequency for non-contention based random access, because of high path loss of high-frequency communication, a narrow beam is required to ensure that a signal has a relatively long propagation range and a relatively high beam gain. However, the narrow beam has limited coverage. To ensure communication quality, the network device and the terminal device need to transmit random access information by using the narrow beam.

Because the terminal device is usually out of synchronization in a non-contention based random access scenario, for the network device, a transmission/reception point (transmission and receiver point, or TRP) that receives the MSG 1 may not be the same as a TRP that sends the MSG 2. For example, when the beam corresponding to the SSB index indicated by the network device carries information used for a neighboring cell to measure a time difference, a TRP that receives the beam may not be the same as a TRP that sends the MSG 2. In other words, using the beam corresponding to the SSB index indicated by the network device as the beam for sending the MSG 2 may cause failure in non-contention based random access. The MSG 2 may also be referred to as a random access response (RAR).

SUMMARY

This application provides a method and an apparatus for non-contention based random access, so as to improve a success rate of non-contention based random access.

According to a first aspect, a method for non-contention based random access is provided, including: receiving a PDCCH order through a first demodulation reference signal DM-RS port, where the PDCCH order includes a first SSB index, and the PDCCH order is used to instruct to perform random access on a first RACH resource corresponding to the first SSB index by using a first preamble; sending, based on the PDCCH order, an MSG 1 on the first RACH resource by using the first preamble; and determining, based on the first DM-RS port, to receive an MSG 2 through a second DM-RS port, where the second DM-RS port has a QCL relationship with the first DM-RS port.

Steps in the foregoing method may be performed, for example, by a terminal device. The terminal device may determine, based on the first DM-RS port through which the PDCCH order is received, the second DM-RS port that has the QCL relationship with the first DM-RS port, and receive the MSG 2 through the second DM-RS port. Because the second DM-RS port has the QCL relationship with the first DM-RS port, a receive beam corresponding to the second DM-RS port can be aligned with a transmit beam on which the MSG 2 is sent, thereby avoiding failure of the terminal device to receive the MSG 2 due to misalignment between a transmit beam and a receive beam that correspond to the SSB index indicated by the PDCCH order.

Optionally, in the QCL relationship, a large-scale channel property corresponding to the second DM-RS port is correlated to a large-scale channel property corresponding to the first DM-RS port, and each large-scale channel property includes one or more of a delay spread, a Doppler spread, a Doppler shift, an average gain, an average delay, and a spatial reception parameter.

Optionally, the determining, based on the first DM-RS port, to receive an MSG 2 through a second DM-RS port includes: determining a spatial reception parameter of the second DM-RS port based on a spatial reception parameter of the first DM-RS port and the QCL relationship; and receiving the MSG 2 based on the spatial reception parameter of the second DM-RS port.

Optionally, the receiving the MSG 2 based on the spatial reception parameter of the second DM-RS port includes: determining, based on the spatial reception parameter of the second DM-RS port, a receive beam corresponding to the second DM-RS port; and receiving the MSG 2 by using the receive beam corresponding to the second DM-RS port.

Optionally, the PDCCH order further includes a first preamble index; and before the sending, based on the PDCCH order, a first message MSG 1 on the first RACH resource by using the first preamble, the method further includes: receiving indication information, where the indication information is used to indicate a correspondence between a plurality of SSB indexes and at least one RACH resource and a correspondence between the plurality of SSB indexes and a plurality of preambles, and the plurality of SSB indexes include the first SSB index; determining, from the plurality of RACH resources and the plurality of preambles based on the indication information and the first SSB index, the first RACH resource and at least two preambles corresponding to the first RACH resource; and determining, based on the first preamble index, the first preamble from the at least two preambles corresponding to the first RACH resource.

According to a second aspect, a method for non-contention based random access is provided, including: sending a PDCCH order through a first demodulation reference signal DM-RS port, where the PDCCH order includes a first SSB index, and the PDCCH order is used to instruct to perform random access on a first RACH resource corresponding to the first SSB index by using a first preamble; receiving, on the first RACH resource, an MSG 1 by using the first preamble; and determining, based on the first DM-RS port, to send an MSG 2 through a second DM-RS port, where the second DM-RS port has a QCL relationship with the first DM-RS port.

Steps in the foregoing method may be performed, for example, by a network device. The network device may determine, based on the first DM-RS port through which the PDCCH order is sent, the second DM-RS port that has the QCL relationship with the first DM-RS port, and send the MSG 2 through the second DM-RS port. Because the second DM-RS port has the QCL relationship with the first DM-RS port, a transmit beam corresponding to the second DM-RS port can be aligned with a receive beam of the MSG 2, thereby avoiding failure of a terminal device to receive the MSG 2 due to misalignment between a transmit beam and a receive beam that correspond to the SSB index indicated by the PDCCH order.

Optionally, in the QCL relationship, a large-scale channel property corresponding to the second DM-RS port is correlated to a large-scale channel property corresponding to the first DM-RS port, and the large-scale channel property includes one or more of a delay spread, a Doppler spread, a Doppler shift, an average gain, an average delay, and a spatial transmit parameter.

Optionally, the determining, based on the first DM-RS port, to send an MSG 2 through a second DM-RS port includes: determining a spatial transmit parameter of the second DM-RS port based on a spatial transmit parameter of the first DM-RS port and the QCL relationship; and sending the MSG 2 based on the spatial transmit parameter of the second DM-RS port.

Optionally, the sending the MSG 2 based on the spatial transmit parameter of the second DM-RS port includes: determining, based on the spatial transmit parameter of the second DM-RS port, a transmit beam corresponding to the second DM-RS port, and sending the MSG 2 by using the transmit beam corresponding to the second DM-RS port.

Optionally, before the receiving, on the first RACH resource, a first message by using the first preamble, the method further includes: broadcasting indication information, where the indication information is used to indicate a correspondence between a plurality of SSB indexes and at least one RACH resource and a correspondence between the plurality of SSB indexes and a plurality of preambles, the plurality of SSB indexes include the first SSB index, the PDCCH order further includes a first preamble index, and the preamble index is used to further indicate the first preamble.

According to a third aspect, an apparatus is provided, where the apparatus has a function of a device that performs the method according to the first aspect or the second aspect, the apparatus includes components configured to perform steps described in the foregoing aspects, and the function may be implemented by software or hardware (such as a circuit) or a combination of hardware and software, for example, implemented in a form of a module.

In a possible design, the apparatus includes one or more processing units and one or more communications units. The one or more processing units are configured to support the apparatus in implementing corresponding functions of the device that performs the foregoing method. For example, the functions include: receiving a PDCCH order through a first demodulation reference signal DM-RS port, where the PDCCH order includes a first SSB index, and the PDCCH order is used to instruct to perform random access on a first RACH resource corresponding to the first SSB index by using a first preamble; sending, based on the PDCCH order, an MSG 1 on the first RACH resource by using the first preamble; and determining, based on the first DM-RS port, to receive an MSG 2 through a second DM-RS port, where the second DM-RS port has a QCL relationship with the first DM-RS port.

Optionally, the apparatus may further include one or more storage units, where the storage unit is configured to be coupled to the processing unit, and the storage unit stores program instructions and/or data necessary for the apparatus. The one or more storage units may be integrated with the processing unit, or may be disposed separately from the processing unit. This is not limited in this application.

The apparatus may be an intelligent terminal, a wearable device, or the like. The communications unit may be a transceiver or a transceiver circuit. Optionally, the transceiver may also be an input/output circuit or interface.

The apparatus may further be a communications chip, where the communications unit may be an input/output circuit or interface of the communications chip.

In another possible design, the apparatus includes a transceiver, a processor, and a memory. The processor is configured to control the transceiver or the input/output circuit to send and receive a signal, the memory is configured to store a computer program, and the processor is configured to run the computer program in the memory, so that the apparatus performs the method according to the first aspect or any possible implementation of the first aspect, or the apparatus performs the method according to the second aspect or any possible implementation of the second aspect.

According to a fourth aspect, a communications system is provided, where the communications system includes the apparatus according to the third aspect.

According to a fifth aspect, a computer readable storage medium is provided, configured to store a computer program, where the computer program includes an instruction used to perform the method according to the first aspect or any possible implementation of the first aspect.

According to a sixth aspect, a computer readable storage medium is provided, configured to store a computer program, where the computer program includes an instruction used to perform the method according to the second aspect or any possible implementation of the second aspect.

According to a seventh aspect, a computer program product is provided, where the computer program product includes computer program code, and when the computer program code is run on a computer, the computer performs the method according to the first aspect or any possible implementation of the first aspect.

According to an eighth aspect, a computer program product is provided, where the computer program product includes computer program code, and when the computer program code is run on a computer, the computer performs the method according to the second aspect or any possible implementation of the second aspect.

DETAILED DESCRIPTION OF ILLUSTRATIVE EMBODIMENTS

Figure 1:
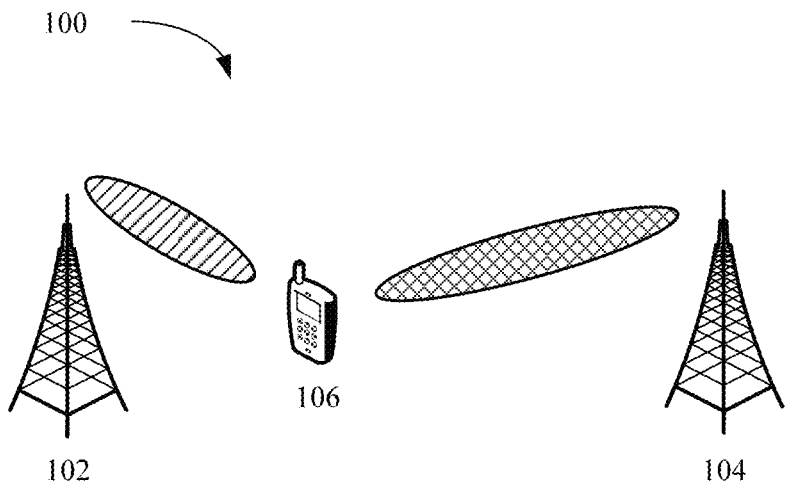
FIG. 1 is a schematic diagram of a communications system applicable to this application.

The following describes the technical solutions of this application with reference to the accompanying drawings.

The technical solutions provided in this application may be applied to various communications systems such as a 5th generation (5G) mobile communications system. The 5G mobile communications system in this application includes a non-standalone (NSA) 5G mobile communications system and/or a standalone (SA) 5G mobile communications system. The technical solutions provided in this application may further be applied to a future communications system such as a 6th generation mobile communications system.

Various aspects, embodiments, or features are presented in this application by describing a system that may include a plurality of devices, components, and modules. It should be understood that, each system may include other devices, components, and modules, and/or may not include all devices, components, and modules discussed with reference to the accompanying drawings. In addition, a combination of these solutions may be used.

In addition, the word "example" in the embodiments of this application is used to represent giving an example, an illustration, or a description. Any embodiment or design solution described as an "example" in this application should not be interpreted as being preferred or having more advantages than another embodiment or design solution. To be precise, the word "example" is used to present a concept in a specific manner.

In the embodiments of this application, "information", "signal", and "message" sometimes can be used interchangeably. It should be noted that, when a difference thereof is not emphasized, meanings to be expressed are consistent. "Of", "relevant", and "corresponding" sometimes can be used interchangeably. It should be noted that, when a difference thereof is not emphasized, meanings to be expressed are consistent.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, as the network architecture evolves and a new service scenario emerges, the technical solutions provided in the embodiments of this application are also applicable to a similar technical problem.

The embodiments of this application may be applied to a conventional typical network, and may also be applied to a future user equipment (UE)-centric (UE-centric) network. A non-cell network architecture is introduced into the UE-centric network. To be specific, a large quantity of small cells are deployed in a specific area to form a hyper cell. Each small cell is a transmission point (TP) or a transmission/reception point (transmission and receiver point, or TRP) of the hyper cell, and is connected to a centralized controller. When UE moves in the hyper cell, a network side device selects a new sub-cluster for the UE in real time to serve the UE, thereby avoiding a real cell handover and achieving service continuity of the UE. The network side device includes a wireless network device. Alternatively, in the UE-centric network, a plurality of network side devices, such as the small cells, may have independent controllers such as distributed controllers. Each small cell can independently perform scheduling for a user, and the small cells exchange information for a long time, so that the small cells can flexibly provide a collaborative service for the UE to an extent.

In the embodiments of this application, different base stations may be base stations with different identifiers, or may be base stations with a same identifier that are deployed in different geographical positions. Before being deployed, a base station does not know whether an application scenario of the embodiments of this application is used. Therefore, before being deployed, the base station or a baseband chip should support a method provided in the embodiments of this application. It may be understood that, the different identifiers of the base stations may be base station identifiers, or may be cell identifiers or other identifiers.

In the embodiments of this application, some scenarios are illustrated by using a new radio (NR) network scenario in the 5G mobile communications system as an example. It should be noted that, the solutions in the embodiments of this application may further be applied to another wireless communications network, and a corresponding name may also be replaced by a name of a corresponding function in the another wireless communications network.

To better understand the embodiments of this application, a communications system applicable to the embodiments of this application is first described in detail by using a communications system shown in FIG. 1 as an example. As shown in FIG. 1, the communications system 100 includes a network device 102 and a terminal device 106. A plurality of antennas may be configured for the network device 102, and a plurality of antennas may also be configured for the terminal device. Optionally, the communications system may further include a network device 104, and a plurality of antennas may also be configured for the network device 104.

It should be understood that, the network device 102 or the network device 104 may further include a plurality of components (for example, a processor, a modulator, a multiplexer, a demodulator, or a demultiplexer) related to signal sending and receiving.

The network device 102 or the network device 104 includes but is not limited to an evolved NodeB (eNB), a radio network controller (RNC), a NodeB (NB), a base station controller (BSC), a base transceiver station (BTS), a home base station (for example, home evolved NodeB, or home NodeB, HNB), a baseband unit (BBU), an access point (AP) in a wireless fidelity (WIFI) system, a wireless relay node, a wireless backhaul node, a TRP, a TP, or the like. Alternatively, the network device 102 or the network device 104 may be a gNB, a TRP, or a TP in the 5G mobile communications system, or one or a group of antenna panels (including a plurality of antenna panels) of a base station in the 5G mobile communications system, or may be a network node that constitutes a gNB or a TP, for example, a baseband unit (building baseband unit, BBU) or a distributed unit (distributed unit, DU).

In some deployments, a gNB may include a centralized unit (CU) and a DU. The gNB may further include a radio frequency unit (RU). The CU implements some functions of the gNB, and the DU implements some functions of the gNB. For example, the CU implements a function of a radio resource control (RRC) layer and a function of a packet data convergence protocol (PDCP) layer, and the DU implements a function of a radio link control (RLC) layer, a function of a media access control (MAC) layer, and a function of a physical (PHY) layer. Information at the RRC layer eventually becomes information at the PHY layer, or is converted from information at the PHY layer. Therefore, in this architecture, it may also be considered that higher layer signaling such as RRC layer signaling or PDCP (packet data convergence protocol) layer signaling is sent by the DU, or sent by the DU and the RU. It may be understood that, a network device may be a CU node, a DU node, or a device including a CU node and a DU node. In addition, the CU may be classified as a network device in a radio access network RAN, or the CU may be classified as a network device in a core network. This is not limited herein.

The terminal device may also be referred to as UE, an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer (Pad), a computer having a wireless transceiver function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application. In this application, the terminal device having a wireless transceiver function and a chip that can be disposed in the terminal device are collectively referred to as a terminal device.

In the communications system 100, the network device 102 and the network device 104 each can communicate with a plurality of terminal devices (for example, the terminal device 106 shown in the figure). The network device 102 and the network device 104 can communicate with one or more terminal devices similar to the terminal device 106. However, it should be understood that, a terminal device that communicates with the network device 102 may be the same as or different from a terminal device that communicates with the network device 104. The terminal device 106 shown in FIG. 1 may communicate with both the network device 102 and the network device 104. However, this merely shows one possible scenario. In some scenarios, the terminal device may communicate with only the network device 102 or the network device 104. This is not limited in this application.

It should be understood that, FIG. 1 is merely an example of a simplified schematic diagram for ease of understanding. The communications system may further include another network device or another terminal device that is not shown in FIG. 1.

As a multiple-antenna technology develops, a plurality of transmit antennas and receive antennas may be configured for a network device and a terminal device each. Some terminal devices may support fewer transmit antennas than receive antennas, for example, 1T2R (that is, one transmit antenna and two receive antennas), 2T4R (that is, two transmit antennas and four receive antennas), or aTbR (a<b). 1T2R is used as an example, and it may be understood as follows. The terminal device can use only one antenna to transmit an uplink signal/channel at the same time, and can use two antennas to receive a downlink signal/channel at the same time. Therefore, when channel state information (CSI) of a downlink channel needs to be obtained by using channel reciprocity, the terminal device may need to send a reference signal for channel sounding, such as a sounding reference signal (SRS), at different times through different antennas. This manner may be referred to as antenna switching or antenna selection.

Before description of the embodiments of this application, several related concepts in the NR are first described briefly.

An antenna port includes at least one of an antenna port of a channel for uplink data transmission (briefly referred to as an uplink data channel, for example, a physical uplink shared channel (PUSCH)), an antenna port of a reference signal for demodulation (briefly referred to as a demodulation reference signal, for example, a demodulation reference signal (DMRS)), or an antenna port of a reference signal for channel sounding (briefly referred to as a sounding reference signal, for example, an SRS), and is an antenna port used to carry a specific physical channel and/or physical signal. Channels corresponding to paths along which signals sent through a same antenna port pass spatially may be considered the same or correlated (for example, large-scale channel properties such as channel matrices H are the same) regardless of whether the signals are sent through a same physical antenna or different physical antennas. In other words, when demodulating signals sent on a same antenna port, a receive end may consider that channels of the signals are the same or correlated. The antenna port is a logical concept and may include an example of a software resource and a hardware resource that are required for transmitting a corresponding signal. Generally, a signal receive end uses antenna ports to identify signals on different transmission channels.

An antenna may also be referred to as a user antenna, a user antenna port, a user port, or the like; and may also be referred to as a transmit antenna or a receive antenna. The antenna may have a correspondence with a feeding port of the antenna. The transmit antenna is an antenna port that is related to a physical transmit antenna, and a physical antenna is usually an array element of a physical antenna. The antenna is also identified by using a port, but is different from an antenna port that carries a physical channel. The transmit antenna is a physical meaning, and the transmit antenna may or may not be associated with a logical port in design. Different antennas may be differentiated by using different identifiers or indexes.

Two antenna ports have a quasi co-location (quasi co-located, QCL) relationship, meaning that a large-scale channel parameter of one antenna port may be inferred by using a large-scale channel parameter (which may also be referred to as a large-scale characteristic) conveyed on another antenna port. The large-scale parameter may include one or more of an average gain, an average delay, a delay spread, a Doppler shift, a Doppler spread, and a spatial parameter.

The spatial parameter may be a spatial transmit parameter (spatial Tx parameter) or a spatial reception parameter (spatial Rx parameter).

For example, the spatial parameter may include one or more of an angle of arrival (AOA), a dominant angle of arrival (dominant AoA), an average angle of arrival (average AoA), an angle of departure (AOD), a channel correlation matrix, a power angular spectrum of an angle of arrival, an average angle of departure (average AoD), a power angular spectrum of an angle of departure, a transmit channel correlation, a receive channel correlation, transmit beamforming, receive beamforming, a spatial channel correlation, a spatial filter, a spatial filtering parameter, weight information, or the like.

The embodiments of this application are described in detail below with reference to the accompanying drawings.

It should be understood that, the technical solutions of this application may be applied to a wireless communications system, for example, the communications system 100 shown in FIG. 1. The communications system may include at least one network device and at least one terminal device. The network device and the terminal device may communicate through a wireless air interface. For example, the network device in the communications system may correspond to the network device 102 and the network device 104 shown in FIG. 1, and the terminal device may correspond to the terminal device 106 shown in FIG. 1.

Without loss of generality, the following describes in detail the embodiments of this application by using a process of interaction between one terminal device and one network device as an example. The terminal device may be a terminal device in a wireless connection relationship with the network device in a wireless communications system. It may be understood that, a reference signal may be transmitted between the network device and a plurality of terminal devices in a wireless connection relationship with the network device in the wireless communications system based on a same technical solution. This is not limited in this application.

Figure 2:
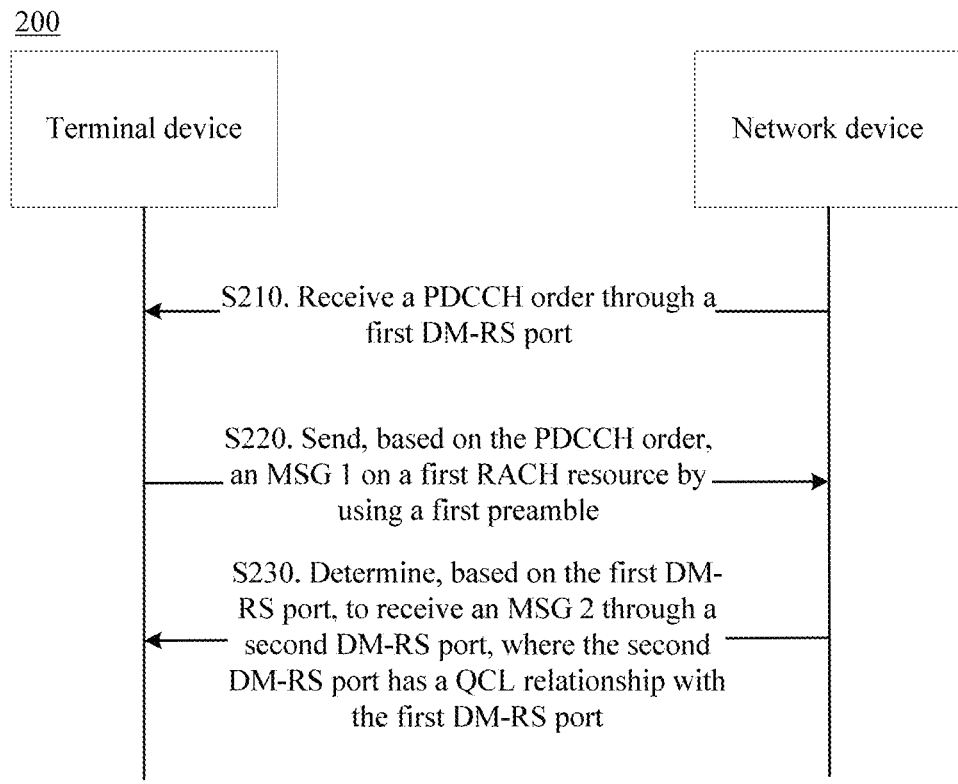
FIG. 2 is a schematic flowchart of a method for non-contention based random access according to this application.

FIG. 2 is a schematic flowchart of a method 200 for non-contention based random access from a perspective of interaction between devices according to an embodiment of this application. As shown in FIG. 2, the method 200 may include the following steps.

S210. Receive a PDCCH order through a first DM-RS port, where the PDCCH order includes a first SSB index, and the PDCCH order is used to instruct to perform random access on a first RACH resource corresponding to the first SSB index by using a first preamble. The PDCCH order is used to trigger a non-contention based random access procedure, and the terminal device sends a physical random access channel (PRACH) based on the PDCCH order. The PRACH may correspond to a random access request (MSG 1). In other words, the MSG 1 corresponds to the PRACH at a physical layer.

S220. Send, based on the PDCCH order, the MSG 1 on the first RACH resource by using the first preamble.

S230. Determine, based on the first DM-RS port, to receive an MSG 2 through a second DM-RS port, where the second DM-RS port has a QCL relationship with the first DM-RS port.

The terminal device may determine, based on the first DM-RS port through which the PDCCH order is received, the second DM-RS port that has the QCL relationship with the first DM-RS port, and receive the MSG 2 through the second DM-RS port. Because the second DM-RS port has the QCL relationship with the first DM-RS port, a large-scale channel property of the second DM-RS port may be inferred from a large-scale channel property of the first DM-RS port, and the terminal device can select an appropriate receive beam based on the inferred large-scale channel property of the second DM-RS port, to align with a transmit beam on which the MSG 2 is sent. In this way, even if the transmit beam changes (for example, the transmit beam changes because a TRP sending the MSG 2 is different from a TRP receiving the MSG 1), the terminal device can still select an appropriate receive beam to align with the transmit beam on which the MSG 2 is sent. Therefore, according to the method 200, failure of the terminal device to receive the MSG 2 due to misalignment between a transmit beam and a receive beam that correspond to the SSB index indicated by the PDCCH order can be avoided.

In this application, for the DM-RS ports (for example, the first DM-RS port and the second DM-RS port), symbols transmitted (including sent and received) through the DM-RS ports require channel estimation, and the channel estimation corresponding to both the DM-RS ports can be obtained by using demodulation pilots sent or received through the DM-RS ports, so as to demodulate the symbols transmitted through the DMRS ports. For example, when demodulating a symbol transmitted on a DM-RS port, a receive end may first obtain channel estimation by using a demodulation pilot (DM-RS) corresponding to the DM-RS port, and use the channel estimation to demodulate the symbol transmitted on the DM-RS port.

In this application, the RACH resource may be a resource that is broadcast by a network device by using a system message and that is used to send the random access request (namely, the MSG 1), or may be a physical random access channel transmission occasion (PRACH Transmission Occasion). In the physical random access channel transmission occasion, a transmit beam on which the terminal device sends a PRACH does not change. For example, one physical random access channel transmission occasion corresponds to duration of one physical random access channel format (PRACH format) in time domain, and corresponds to a frequency resource corresponding to the physical random access channel format in frequency domain.

Optionally, as described in S230, the second DM-RS port has a QCL relationship with the first DM-RS port, meaning that the large-scale channel property corresponding to the second DM-RS port can be inferred based on the large-scale channel property corresponding to the first DM-RS port. In other words, the large-scale channel property corresponding to the second DM-RS port is correlated to the large-scale channel property corresponding to the first DM-RS port. For example, the QCL relationship may be that the large-scale channel property corresponding to the second DM-RS port is the same as the large-scale channel property corresponding to the first DM-RS port, or may be that the large-scale channel property corresponding to the first DM-RS port is similar to the large-scale channel property corresponding to the second DM-RS port, or may be a preset model for inferring the large-scale channel property corresponding to the second DM-RS port from the large-scale channel property corresponding to the first DM-RS port, or may be another table for searching for the large-scale channel property corresponding to the second DM-RS port based on the large-scale channel property corresponding to the first DM-RS port, or may be an association relationship in another form. This is not limited in this application.

Optionally, S230 includes the following steps.

S231. Determine a spatial reception parameter of the second DM-RS port based on a spatial reception parameter of the first DM-RS port and the QCL relationship.

S232. Receive the MSG 2 based on the spatial reception parameter of the second DM-RS port.

The spatial reception parameter may include one or more of an angle of arrival (AOA), a dominant angle of arrival (dominant AoA), an average angle of arrival (average AoA), a power angular spectrum of an angle of arrival (PAS of an AoA), an angle of departure (AOD), an average angle of departure (average AOD), a channel correlation matrix, a power angular spectrum of an angle of departure, a transmit channel correlation, a receive channel correlation, transmit beamforming, receive beamforming, a spatial channel correlation, a spatial filter, a spatial filtering parameter, weight information, or the like.

After determining the spatial reception parameter of the second DM-RS port, the terminal device may set one or more of related parameters for receiving the MSG 2, such as an angle of arrival, a channel correlation matrix, a spatial filtering parameter, and a receive beam.

Optionally, S232 includes the following steps.

S2321. Determine, based on the spatial reception parameter of the second DM-RS port, a receive beam corresponding to the second DM-RS port.

S2322. Receive the MSG 2 by using the receive beam corresponding to the second DM-RS port.

Alternatively, the terminal device may determine, from a plurality of candidate receive beams based on a receive beam measurement and tracking model, the receive beam for receiving the MSG 2, and the receive beam for receiving the MSG 2 is a preferential receive beam in the plurality of candidate receive beams, so that a success rate of non-contention based random access can be further increased.

Optionally, for example, the terminal device determines a second receive beam based on the spatial reception parameter of the second DM-RS port and a reference signal (for example, an SSB or a CSI-RS) for beam management, so that the terminal device successfully receives, by using the second receive beam, the MSG 2 transmitted through the second DM-RS port, or the second receive beam of the terminal device is aligned with the transmit beam of the second DM-RS port.

Optionally, the PDCCH order further includes a first preamble index. Optionally, the method 200 may further include the following steps, and these steps may be prior to S210.

S201. Receive indication information, where the indication information is used to indicate a correspondence between a plurality of SSB indexes and at least one RACH resource and a correspondence between the plurality of SSB indexes and a plurality of preambles, and the plurality of SSB indexes include the first SSB index.

S202. Determine, from the plurality of RACH resources and the plurality of preambles based on the indication information and the first SSB index that is included in the PDCCH order, the first RACH resource and at least two preambles corresponding to the first RACH resource.

S203. Determine, based on the first preamble index included in the PDCCH order, the first preamble from the at least two preambles corresponding to the first RACH resource.

In S201, the indication information is, for example, carried in a system information block (SIB) 1. The indication information may be carried in a master information block (MIB). Both a message carrying the indication information and a specific form of the indication information are not limited in this application.

In addition, the correspondence between the plurality of SSB indexes and the plurality of RACH resources may be indicated by the indication information, or may be preset, or may be obtained through mapping according to a preset rule based on a parameter indicated by the indication information. The correspondence between the plurality of SSB indexes and the plurality of preambles may be indicated by the indication information, or may be preset, or may be obtained through mapping according to a preset rule based on a parameter indicated by the indication information.

The terminal device may determine the first RACH resource based on the first SSB index carried in the PDCCH order and the correspondence, indicated by the indication information, between the plurality of SSB indexes and the plurality of RACH resources. The first RACH resource is a RACH resource in the plurality of RACH resources that corresponds to the first SSB index. The terminal device may determine, based on the correspondence, indicated by the indication information, between the plurality of SSB indexes and the plurality of preambles, the at least two preambles corresponding to the first RACH resource. Subsequently, the terminal device determines the first preamble from the at least two preambles based on the first preamble index carried in the PDCCH order.

Figure 3:
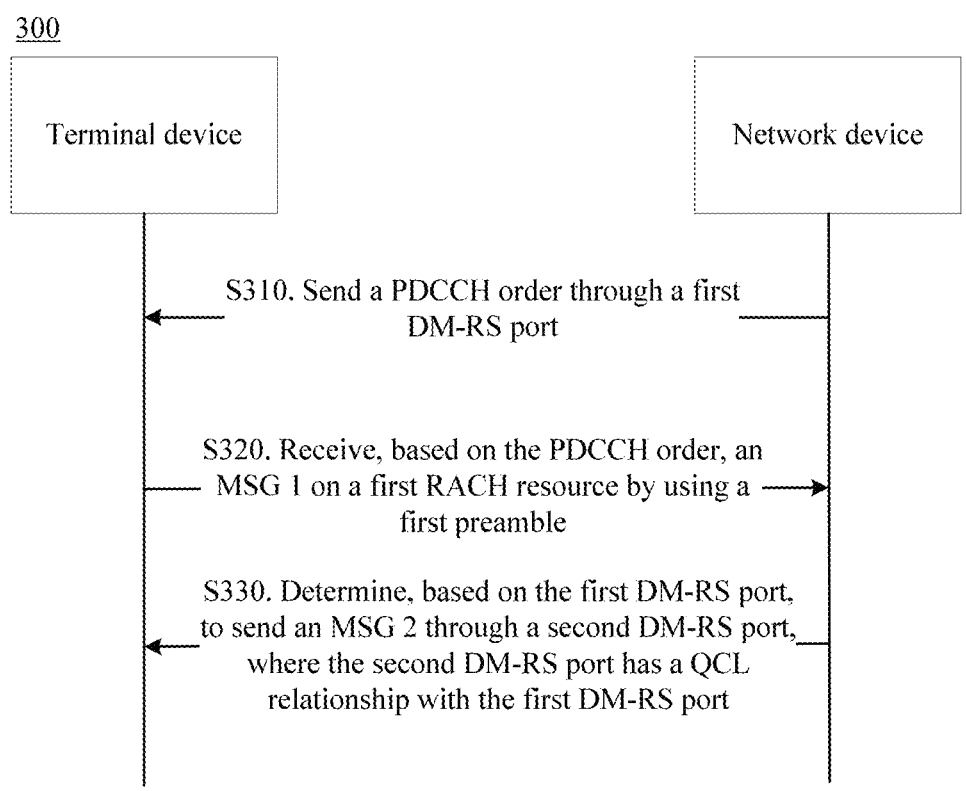
FIG. 3 is a schematic flowchart of another method for non-contention based random access according to this application.

It should be understood that, the method 200 is a method for non-contention based random access described from a perspective of the terminal device according to this application. For a network device, a method 300, applicable to the network device, for non-contention based random access according to this application is shown in FIG. 3. The method 300 includes the following steps.

S310. Send a PDCCH order through a first DM-RS port, where the PDCCH order includes a first SSB index, and the PDCCH order is used to instruct to perform random access on a first RACH resource corresponding to the first SSB index by using a first preamble.

S320. Receive, on the first RACH resource, an MSG 1 by using the first preamble.

S330. Determine, based on the first DM-RS port, to send an MSG 2 through a second DM-RS port, where the second DM-RS port has a QCL relationship with the first DM-RS port.

The network device may determine, based on the first DM-RS port through which the PDCCH order is sent, the second DM-RS port that has the QCL relationship with the first DM-RS port, and send the MSG 2 through the second DM-RS port, so that the terminal device does not need to receive the MSG 2 by using a beam corresponding to the SSB index indicated by the PDCCH order. Because the second DM-RS port has the QCL relationship with the first DM-RS port, a large-scale channel property of the second DM-RS port may be inferred from the large-scale channel property of the first DM-RS port, and the terminal device can select an appropriate receive beam based on the inferred large-scale channel property of the second DM-RS port, to align with a transmit beam on which the MSG 2 is sent. In this way, even if the transmit beam changes (for example, the transmit beam changes because a TRP sending the MSG 2 is different from a TRP receiving the MSG 1), the terminal device can select an appropriate receive beam to align with the transmit beam on which the MSG 2 is sent, thereby avoiding failure of the terminal device to receive the MSG 2 due to misalignment between a transmit beam and a receive beam that correspond to the SSB index indicated by the PDCCH order.

Optionally, as described in S330, the second DM-RS port has a QCL relationship with the first DM-RS port, meaning that the large-scale channel property corresponding to the second DM-RS port can be inferred based on the large-scale channel property corresponding to the first DM-RS port. In other words, the large-scale channel property corresponding to the second DM-RS port is correlated to the large-scale channel property corresponding to the first DM-RS port. The association relationship may be that the large-scale channel property corresponding to the second DM-RS port is the same as the large-scale channel property corresponding to the first DM-RS port, or may be that the large-scale channel property corresponding to the first DM-RS port is similar to the large-scale channel property corresponding to the second DM-RS port, or may be a preset model for inferring the large-scale channel property corresponding to the second DM-RS port from the large-scale channel property corresponding to the first DM-RS port, or may be another table for searching for the large-scale channel property corresponding to the second DM-RS port based on the large-scale channel property corresponding to the first DM-RS port, or may be an association relationship in another form. This is not limited in this application.

Optionally, S330 includes the following steps.

S331. Determine a spatial transmit parameter of the second DM-RS port based on a spatial transmit parameter of the first DM-RS port and an association relationship.

S332. Send the MSG 2 based on the spatial transmit parameter of the second DM-RS port.

After determining the spatial transmit parameter of the second DM-RS port, the network device may set one or more of related parameters for receiving the MSG 2, such as an angle of departure, a channel correlation matrix, a spatial filtering parameter, and a transmit beam.

The spatial transmit parameter includes one or more of an angle of arrival (AOA), a dominant angle of arrival (dominant AoA), an average angle of arrival (average AoA), a power angular spectrum of an angle of arrival (PAS of an AoA), an angle of departure (AOD), an average angle of departure (average AOD), a channel correlation matrix, a power angular spectrum of an angle of departure, a transmit channel correlation, a receive channel correlation, transmit beamforming, receive beamforming, a spatial channel correlation, a spatial filter, a spatial filtering parameter, weight information, or the like.

Optionally, S332 includes the following steps.

S3321. Determine, based on the spatial transmit parameter of the second DM-RS port, a transmit beam corresponding to the second DM-RS port.

S3322. Send the MSG 2 by using the transmit beam corresponding to the second DM-RS port.

Alternatively, the network device may determine a transmit beam for sending the MSG 2 from a plurality of candidate transmit beams. The transmit beam for sending the MSG 2 is a preferential transmit beam in the plurality of candidate transmit beams, or the transmit beam is the same as or similar to a transmit beam of the first DM-RS port, so that a success rate of non-contention based random access can be further increased.

Optionally, the method 300 may further include the following steps, and these steps may be prior to S310.

S300. Broadcast indication information, where the indication information is used to indicate a correspondence between a plurality of SSB indexes and at least one RACH resource and a correspondence between the plurality of SSB indexes and a plurality of preambles, the plurality of SSB indexes include the first SSB index, the PDCCH order further includes a first preamble index, and the preamble index is used to further indicate the first preamble.

In S301, the indication information is, for example, carried in an SIB 1. The indication information may be carried in an MIB. Both a message carrying the indication information and a specific form of the indication information are not limited in this application.

In addition, the correspondence between the plurality of SSB indexes and the plurality of RACH resources may be indicated by the indication information, or may be preset, or may be obtained through mapping according to a preset rule based on a parameter indicated by the indication information. The correspondence between the plurality of SSB indexes and the plurality of preambles may be indicated by the indication information, or may be preset, or may be obtained through mapping according to a preset rule based on a parameter indicated by the indication information.

A person skilled in the art may clearly learn that, in the method 300, both the network device and the terminal device may be equivalent to the network device and the terminal device in the method 200, and an action of the network device and an action of the terminal device in the method 300 correspond to an action of the network device and an action of the terminal device in the method 200. For brevity, details are not described herein again.

The following further gives an embodiment of non-contention based random access provided in this application.

A network device sends SSBs in a plurality of beam directions, each SSB corresponds to at least one RACH resource or preamble, and the network device notifies a terminal device of the foregoing correspondence by using an SIB 1. When the terminal device enters a connected mode, a beam pair X corresponding to user search space (USS) and a physical downlink shared channel (PDSCH) is established and maintained between the terminal device and the network device. In other words, both a PDCCH and a PDSCH that correspond to data in the connected mode are transmitted by using the beam pair X, and the beam pair X corresponds to a transmit beam of the network device and a receive beam of the terminal device. Because both the PDCCH and the PDSCH that correspond to the data in the connected mode are transmitted by using the beam pair X, DM-RS ports of the PDCCH and the PDSCH have a same QCL relationship. Optionally, the DM-RS ports of the PDCCH and the PDSCH are the same.

When the network device determines that the terminal device is out of synchronization on uplink, or when the network device requires the terminal device to send a beam in an uplink direction for positioning measurement, the network device sends a PDCCH order to the terminal device over the USS. The PDCCH order is used to trigger the terminal device to send an MSG 1 on a RACH resource and a preamble that are indicated by the PDCCH order.

Table 1 shows an example of the PDCCH order.

TABLE 1

| Item (Item) | Size |
| --- | --- |
| Carrier indicator (uplink (UL) or supplementary uplink (SUL)) | 1 bit |
| Bandwidth part index (BWP index) | 2 bits |
| Preamble index | 6 bits |

TABLE 1-continued

| Item (Item) | Size |
| --- | --- |
| Physical random access channel mask (PRACH Mask) | 3 bits |
| SSB index (Index of an SSB) (Optional) | 2 bits |

Table 1 is merely an example for description. Information included in the PDCCH order is not limited thereto, and a quantity of bits of the information included in the PDCCH order is not limited to that shown in Table 1.

Figure 4:
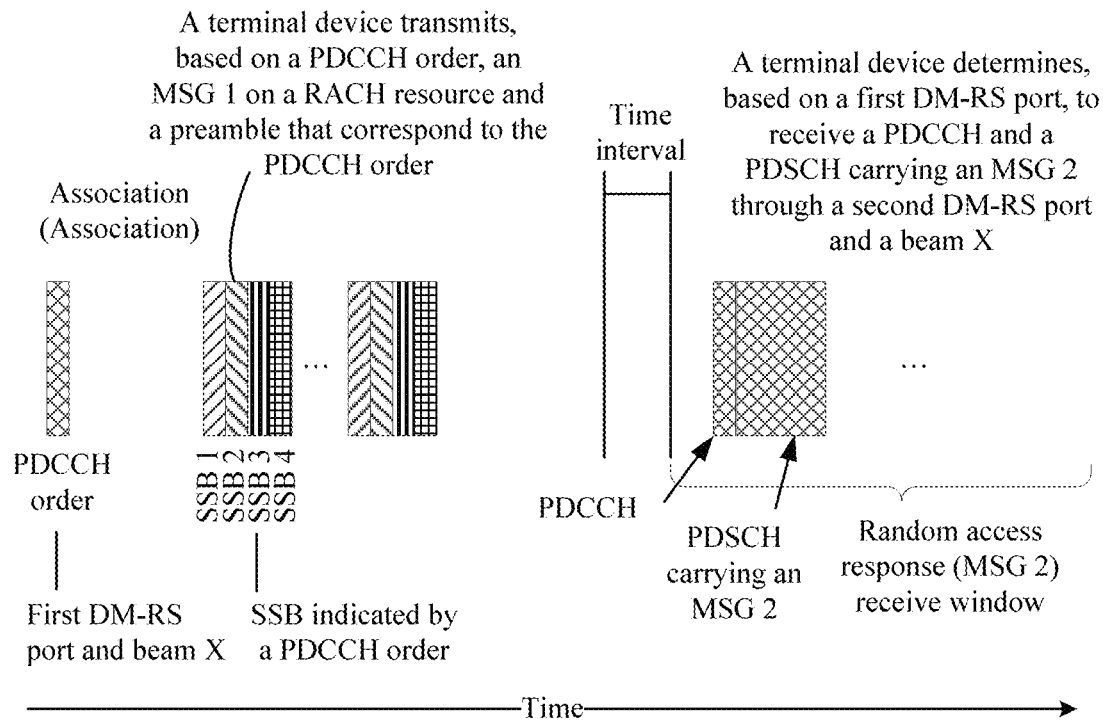
FIG. 4 is a schematic flowchart of still another method for non-contention based random access according to this application.

It can be learned from Table 1 that the PDCCH order carries an SSB index, and the SSB index indicates an SSB, for example, an SSB2 shown in FIG. 4. After receiving the PDCCH order, the terminal device sends the MSG 1 on the RACH resource and the preamble that are indicated by the PDCCH order. After the network device detects the MSG 1, the network device needs to feed back an MSG 2. The network device may send a PDCCH in common search space for sending a RACH, and use the PDCCH to schedule a PDSCH carrying the MSG 2. In addition, a DM-RS port through which the MSG 2 is sent has a QCL relationship with the DM-RS port through which the PDCCH order is sent. Therefore, the terminal device may determine, based on the DM-RS port through which the PDCCH order is received (that is, a first DM-RS port) and the QCL relationship, the DM-RS port through which the MSG 2 is received (that is, a second DM-RS port), and receive the MSG 2 by using a receive beam (that is, a beam X) corresponding to the second DM-RS port, thereby avoiding failure of the terminal device to receive the MSG 2 due to misalignment between a transmit beam and a receive beam that correspond to the SSB2. As described above, both the PDCCH and the PDSCH that correspond to the data in the connected mode are transmitted by using the beam pair X, and the beam pair X corresponds to the transmit beam of the network device and the receive beam of the terminal device; therefore, beams for receiving the PDCCH and the PDSCH (or the MSG 2) may be the same, for example, both are the beam X. Therefore, the DM-RS ports of the PDCCH and the PDSCH have a same QCL relationship. Optionally, the DM-RS ports of the PDCCH and the PDSCH are the same.

In FIG. 4, different fill patterns represent different beams, and a same fill pattern represents a same beam.

The foregoing describes in detail the method for non-contention based random access provided in this application with reference to FIG. 1 to FIG. 4. The following describes in detail an apparatus for non-contention based random access provided in this application with reference to FIG. 5 to FIG. 7.

Figure 5:
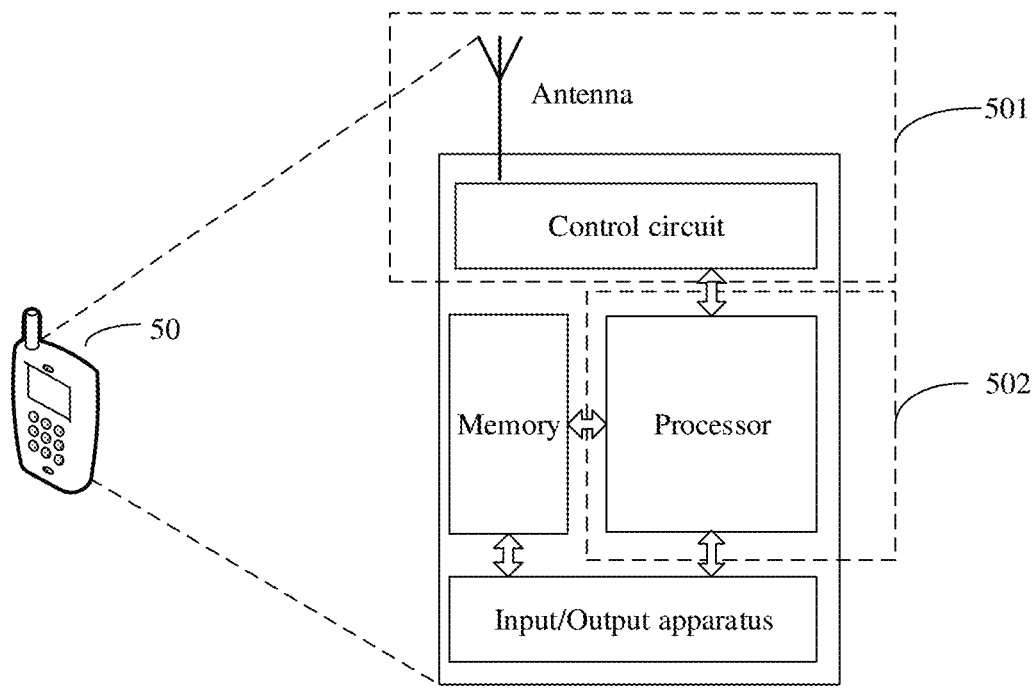
FIG. 5 is a schematic structural diagram of a terminal device according to this application.

FIG. 5 is a schematic structural diagram of a terminal device according to this application. The terminal device may be applied to the system shown in FIG. 1, and perform the functions of the terminal device in the foregoing method embodiments. For ease of description, FIG. 5 shows only main components of the terminal device. As shown in FIG. 5, the terminal device 50 includes a processor, a memory, a control circuit, an antenna, and an input/output apparatus. The processor is mainly configured to: process a communications protocol and communications data, control the entire terminal device, execute a software program, and process data of the software program, for example, to support the terminal device in performing the actions described in the foregoing method embodiments, such as sending uplink data based on indication information of a reference signal. The memory is mainly configured to store the software program and data, for example, store the correspondence described in the foregoing embodiments. The control circuit is mainly configured to perform conversion between a baseband signal and a radio frequency signal, and processing of the radio frequency signal. The control circuit and the antenna together may also be referred to as a transceiver, which is mainly configured to send and receive a radio frequency signal in a form of electromagnetic wave. The input/output apparatus, such as a touchscreen, a display, or a keyboard, is mainly configured to: receive data entered by a user and output data to the user.

After the terminal device is powered on, the processor may read the software program in a storage unit, interpret and execute an instruction of the software program, and process the data of the software program. When the data needs to be sent wirelessly, the processor performs baseband processing on the to-be-sent data, and then outputs a baseband signal to a radio frequency circuit. The radio frequency circuit performs radio frequency processing on the baseband signal, and then sends a radio frequency signal through the antenna in a form of electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 5 shows only one memory and one processor. In an actual terminal device, there may be a plurality of processors and a plurality of memories. The memory may also be referred to as a storage medium, a storage device, or the like. This is not limited in this application.

In an optional implementation, the processor may include a baseband processor and/or a central processing unit. The baseband processor is mainly configured to process a communications protocol and communications data, and the central processing unit is mainly configured to control the entire terminal device, execute a software program, and process data of the software program. The processor in FIG. 5 may integrate functions of the baseband processor and the central processing unit. A person skilled in the art may understand that, the baseband processor and the central processing unit may also be mutually independent processors, interconnected by using a technology such as a bus. A person skilled in the art may understand that, the terminal device may include a plurality of baseband processors to adapt to different network standards, the terminal device may include a plurality of central processing units to enhance its processing capability, and components of the terminal device may be connected by using various buses. The baseband processor may also be expressed as a baseband processing circuit or a baseband processing chip. The central processing unit may also be expressed as a central processing circuit or a central processing chip. The function of processing the communications protocol and the communications data may be built into the processor, or may be stored in a form of a software program in a storage unit, so that the processor implements the baseband processing function by executing the software program.

In this embodiment of this application, the antenna having a transceiver function and the control circuit may be considered as a transceiver unit 501 of the terminal device 50, for example, configured to support the terminal device in performing a receiving function and a sending function described in FIG. 2 and/or FIG. 3. The processor having a processing function is considered as a processing unit 502 of the terminal device 50. As shown in FIG. 5, the terminal device 50 includes the transceiver unit 501 and the processing unit 502. The transceiver unit may also be referred to as a transceiver, a transceiving machine, a transceiver apparatus, or the like. Optionally, a component configured to implement the receiving function in the transceiver unit 501 may be considered as a receiving unit, and a component configured to implement the sending function in the transceiver unit 501 may be considered as a sending unit. In other words, the transceiver unit 501 includes the receiving unit and the sending unit. The receiving unit may also be referred to as a receiver, an input interface, a receiver circuit, or the like, and the sending unit may be referred to as a transmitter, a transmitting device, a transmitter circuit, or the like. For example, the transceiver unit 501 may not include the antenna, but includes only the circuit part, so that the antenna is disposed outside the transceiver unit.

The processor 502 may be configured to execute an instruction stored in the memory to control the transceiver unit 501 to receive a signal and/or send a signal, thereby completing the functions of the terminal device in the foregoing method embodiments. In an implementation, a function of the transceiver unit 501 may be implemented by using a transceiver circuit or a dedicated transceiver chip. During sending and receiving of various signals, for example, receiving of a PDCCH order, the processor 502 controls the transceiver unit 501 to implement the receiving. Therefore, the processor 502 is a decider of the signal sending and receiving, and initiates data sending and receiving operations. The transceiver unit 501 is a performer of the signal sending and receiving.

Figure 6:
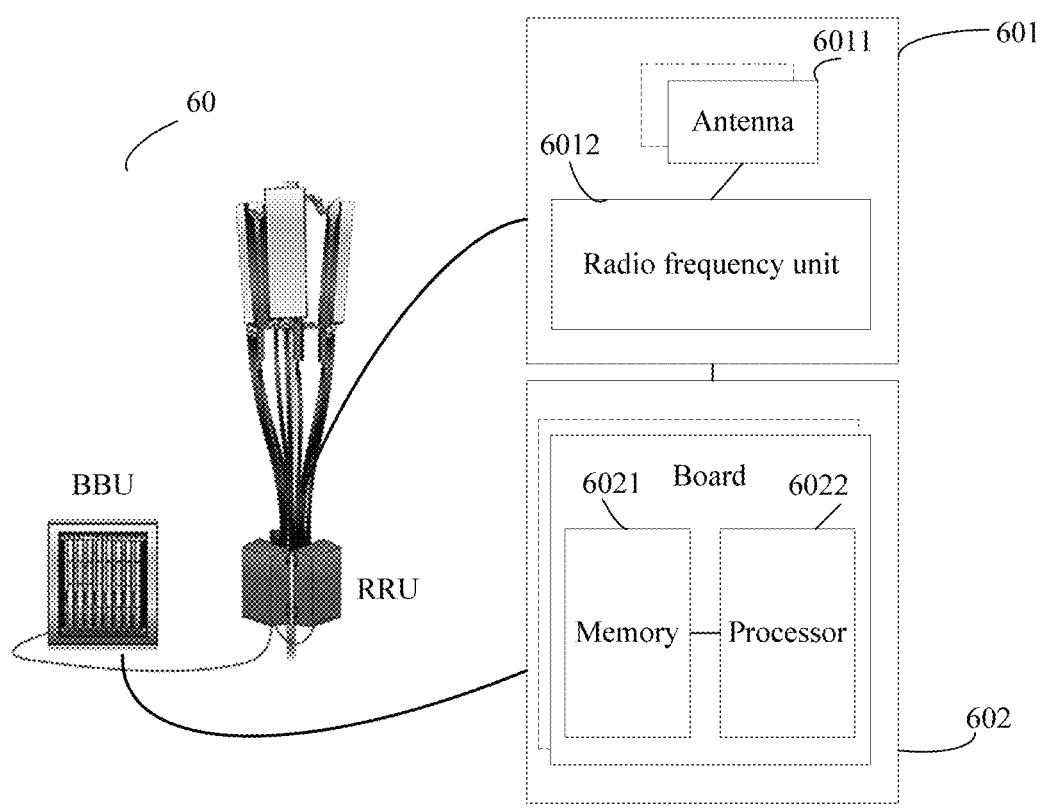
FIG. 6 is a schematic structural diagram of a network device according to this application.

FIG. 6 is a schematic structural diagram of a network device according to an embodiment of this application. For example, the network device may be a base station. As shown in FIG. 6, the base station may be applied to the system shown in FIG. 1, and perform the functions of the network device in the foregoing method embodiments. The base station 60 may include one or more radio frequency units, for example, a remote radio unit (RRU) 601 and one or more baseband units (BBU) (which may also be referred to as digital units (DU)) 602. The RRU 601 may be referred to as a transceiver unit, a transceiver, a transceiver circuit, a transceiver, or the like, and may include at least one antenna 6011 and a radio frequency unit 6012. The RRU 601 is mainly configured to send and receive a radio frequency signal and perform conversion between the radio frequency signal and the baseband signal, for example, configured to receive the MSG 2 described in the foregoing embodiments. The BBU 602 is mainly configured to perform baseband processing, control the base station, and the like. The RRU 601 and the BBU 602 may be physically disposed together; or may be physically and separately disposed, namely, are distributed base stations.

The BBU 602 is a control center of the base station and may also be referred to as a processing unit, mainly configured to implement a baseband processing function, such as channel coding, multiplexing, modulation, or spread spectrum. For example, the BBU (processing unit) 602 may be configured to control the base station to perform the operation procedures of the network device in the foregoing method embodiments.

In an embodiment, the BBU 602 may include one or more boards. The plurality of boards may jointly support a radio access network of a single access standard (for example, a long term evolution (LTE) network), or may support radio access networks of different access standards (for example, an LTE network, a 5G network, or another network). The BBU 602 further includes a memory 6021 and a processor 6022, and the memory 6021 is configured to store necessary instructions and data. For example, the memory 6021 stores the correspondence in the foregoing embodiments. The processor 6022 is configured to control the base station to perform necessary actions, for example, to control the base station to perform the operation procedures of the network device in the foregoing method embodiments. The memory 6021 and the processor 6022 may serve one or more boards. In other words, a memory and a processor may be disposed on each board, or a same memory and a same processor may be shared by a plurality of boards. In addition, a necessary circuit may be disposed on each board.

Figure 7:
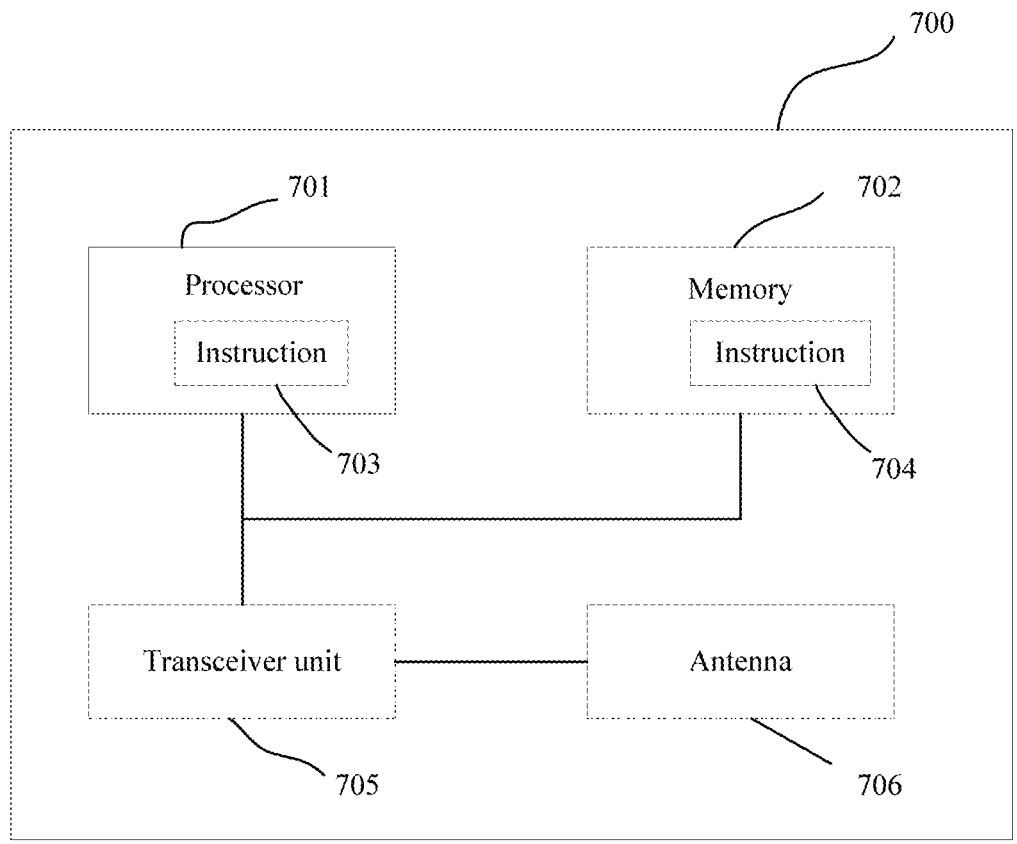
FIG. 7 is a schematic structural diagram of a communications apparatus according to this application.

FIG. 7 is a schematic diagram of a communications apparatus 700. The apparatus 700 may be configured to perform the steps of the methods described in the foregoing method embodiments. For details, refer to the descriptions in the foregoing method embodiments. The communications apparatus 700 may be a chip, a network device (such as a base station), a terminal device, another communications device, or the like.

The communications apparatus 700 includes one or more processors 701. The processor 701 may be a general purpose processor, a dedicated processor, or the like. For example, the processor 701 may be a baseband processor or a central processing unit. The baseband processor may be configured to process a communications protocol and communications data, and the central processing unit may be configured to control the communications apparatus (such as a base station, a terminal, or a chip), execute a software program, and process data of the software program. The communications apparatus may include a transceiver unit to implement inputting (receiving) and outputting (sending) of a signal. For example, the communications apparatus may be a chip, and the transceiver unit may be an input and/or output circuit of the chip or a communications interface. The chip may be used for a terminal, a base station, or another communications device. For another example, the communications apparatus may be a terminal, a base station, or another communications device, and the transceiver unit may be a transceiver, a radio frequency chip, or the like.

The communications apparatus 700 includes at least one processor 701, and the at least one processor 701 may implement the functions of the network device or the terminal device in the embodiments shown in FIG. 2 and/or FIG. 3.

In a possible design, the communications apparatus 700 includes a component configured to generate an MSG 2 and a component configured to send the MSG 2. A function of the component for generating the MSG 2 may be implemented by using one or more processors, and the MSG 2 may be sent by using a transceiver, an input/output circuit, or an interface of a chip. For a method for sending the MSG 2, refer to related descriptions in the foregoing method embodiments.

In another possible design, the communications apparatus 700 includes a component configured to determine a second DM-RS port and a component configured to receive an MSG 2. A function of the component for determining the second DM-RS port may be implemented by using one or more processors, and the MSG 2 may be received by using a transceiver, an input/output circuit, or an interface of a chip. For a method for receiving the MSG 2, refer to related descriptions in the foregoing method embodiments.

Optionally, in addition to implementing functions of the embodiments shown in FIG. 2 and/or FIG. 3, the processor 701 may further implement other functions.

Optionally, in one design, the processor 701 may execute instructions, so that the communications apparatus 700 performs the steps described in the foregoing method embodiments. The instructions may be completely or partially stored in the processor, for example, an instruction 703; or may be completely or partially stored in a memory 702 coupled to the processor, for example, an instruction 704. Alternatively, the instruction 703 and the instruction 704 may jointly enable the communications apparatus 700 to perform the steps described in the foregoing method embodiments.

In still another possible design, the communications apparatus 700 may include a circuit, and the circuit may implement the functions of the network device or the terminal device in the foregoing method embodiments.

In yet another possible design, the communications apparatus 700 may include one or more memories 702, storing an instruction 704. The instruction may be run on the processor, so that the communications apparatus 700 performs the methods described in the foregoing method embodiments. Optionally, the memory may further store data. Optionally, the processor may also store an instruction and/or data. For example, the one or more memories 702 may store the correspondence described in the foregoing embodiments, the related parameter or table in the foregoing embodiments, or the like. The processor and the memory may be disposed separately, or may be integrated together.

In still yet another possible design, the communications apparatus 700 may further include a transceiver unit 705 and an antenna 706. The processor 701 may be referred to as a processing unit, and control the communications apparatus (a terminal or a base station). The transceiver unit 705 may be referred to as a transceiver, a transceiver circuit, a transceiver, or the like, to implement a transceiver function of the communications apparatus by using the antenna 706.

Figure 8:
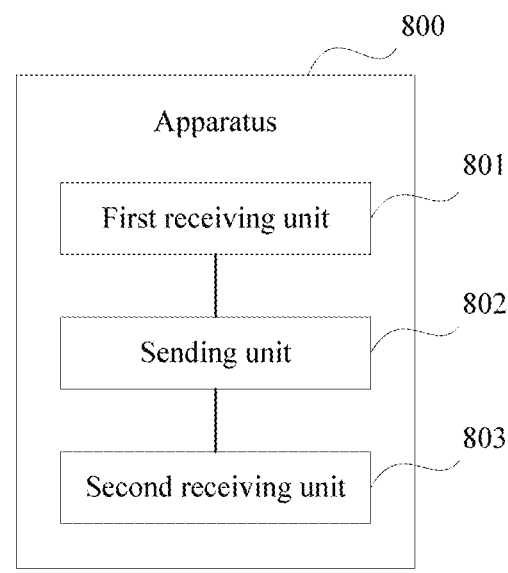
FIG. 8 is a schematic structural diagram of an apparatus for non-contention based random access according to this application.

FIG. 8 is a schematic structural diagram of an apparatus for non-contention based random access according to this application. The apparatus 800 includes a first receiving unit 801, a sending unit 802, and a second receiving unit 803.

The first receiving unit 801 is configured to receive a PDCCH order through a first DM-RS port, where the PDCCH order includes a first SSB index, and the PDCCH order is used to instruct to perform random access on a first RACH resource corresponding to the first SSB index by using a first preamble.

The sending unit 802 is configured to send, based on the PDCCH order received by the first receiving unit 801, an MSG 1 on the first RACH resource by using the first preamble.

The second receiving unit 803 is configured to determine, based on the first DM-RS port, to receive an MSG 2 through a second DM-RS port, where the second DM-RS port has a QCL relationship with the first DM-RS port.

Functions that can be implemented by the foregoing units are merely an example for description. The foregoing units may further implement other functions, for example, implement corresponding functions by performing corresponding steps in the method 200.

It should be understood that, division of the foregoing units is merely functional division, and another division method may be used in actual implementation. For example, the first receiving unit 801 and the second receiving unit 803 are located in one receiving unit, and/or the first receiving unit 801 and the sending unit 802 are located in one communications module.

The apparatus 800 may further include another unit, for example, a processing unit, configured to determine the first preamble according to the foregoing method embodiments.

Figure 9:
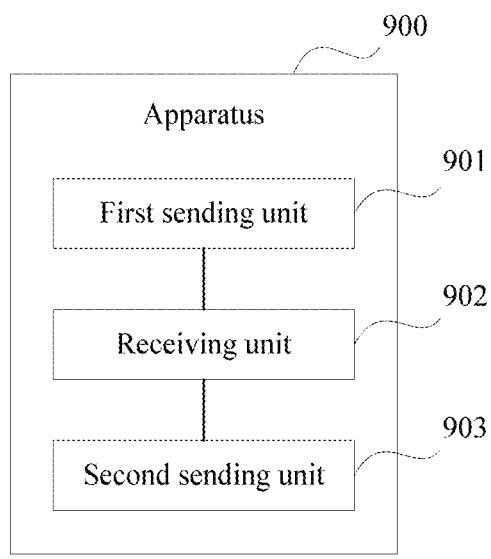
FIG. 9 is a schematic structural diagram of another apparatus for non-contention based random access according to this application.

FIG. 9 is a schematic structural diagram of another apparatus for non-contention based random access according to this application. The apparatus 900 includes a first sending unit 901, a receiving unit 902, and a second sending unit 903.

The first sending unit 901 is configured to send a PDCCH order through a first DM-RS port, where the PDCCH order includes a first SSB index, and the PDCCH order is used to instruct to perform random access on a first RACH resource corresponding to the first SSB index by using a first preamble.

The receiving unit 902 is configured to receive, on the first RACH resource, an MSG 1 by using the first preamble.

The second sending unit 902 is configured to determine, based on the first DM-RS port, to send an MSG 2 through a second DM-RS port, where the second DM-RS port has a QCL relationship with the first DM-RS port.

Functions that can be implemented by the foregoing units are merely an example for description. The foregoing units may further implement other functions, for example, implement corresponding functions by performing corresponding steps in the method 300.

It should be understood that, division of the foregoing units is merely functional division, and another division method may be used in actual implementation. For example, the first sending unit 901 and the second sending unit 903 are located in one sending module, and/or the first sending unit 901 and the receiving unit 902 are located in one communications module.

The apparatus 900 may further include another unit, for example, a processing unit, configured to broadcast indication information according to the foregoing method embodiments.

This application further provides a communications system, including the foregoing one or more network devices and the foregoing one or more terminal devices.

It should be noted that, the processor in the embodiments of this application may be an integrated circuit chip having a signal processing capability. In an implementation process, steps in the foregoing method embodiments can be implemented by using a hardware integrated logical circuit in the processor, or by using an instruction in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly implemented by using a hardware decoding processor, or implemented by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in a memory, and a processor reads information in the memory and completes the steps in the foregoing methods in combination with hardware of the processor.

It may be understood that, the memory in the embodiments of this application may be a volatile memory or a nonvolatile memory, or may include both a volatile memory and a nonvolatile memory. The nonvolatile memory may be a read-only memory (ROM), a programmable read-only memory (programmable ROM, or PROM), an erasable programmable read-only memory (erasable PROM, or EPROM), an electrically erasable programmable read-only memory (electrically EPROM, or EEPROM), or a flash memory. The volatile memory may be a random access memory (RAM), configured as an external cache. The following is used as an example instead of a limitation. Many forms of RAMs may be used, for example, a static random access memory (static RAM, or SRAM), a dynamic random access memory (dynamic RAM, or DRAM), a synchronous dynamic random access memory (synchronous DRAM, or SDRAM), a double data rate synchronous dynamic random access memory (double data rate SDRAM, or DDR SDRAM), an enhanced synchronous dynamic random access memory (enhanced SDRAM, or ESDRAM), a synchronous link dynamic random access memory (synchlink DRAM, or SLDRAM), and a direct rambus random access memory (direct rambus RAM, or DR RAM). It should be noted that, the memory of the systems and methods described in this specification includes but is not limited to these memories and any memory of another proper type.

This application further provides a computer readable medium, and a computer program is stored on the computer readable medium. When the computer program is run by a computer, functions of any one of the foregoing method embodiments are implemented.

This application further provides a computer program product. When the computer program product is run by a computer, functions of any one of the foregoing method embodiments are implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instruction is loaded and executed on a computer, the procedures or functions according to the embodiments of this application are completely or partially generated. The computer may be a general-purpose computer, a special-purpose computer, a computer network, or another programmable apparatus. The computer instruction may be stored in a computer readable storage medium, or may be transmitted from one computer readable storage medium to another computer readable storage medium. For example, the computer instruction may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

This application further provides a processing apparatus, including a processor and an interface. The processor is configured to perform the steps described in any one of the foregoing method embodiments.

It should be understood that, the processing apparatus may be a chip, and the processor may be implemented by using hardware or software. When implemented by using hardware, the processor may be a logic circuit, an integrated circuit, or the like. When implemented by using software, the processor may be a general purpose processor implemented by reading software code stored in a memory. The memory may be integrated in the processor or may exist independently of the processor.

It should be understood that, an "embodiment" mentioned throughout this specification means that particular features, structures, or characteristics related to the embodiment are included in at least one embodiment of this application. Therefore, the embodiments throughout this specification may be not necessarily the same embodiment. In addition, these particular features, structures, or characteristics may be combined in one or more embodiments by using any appropriate manner. It should be understood that, sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes merely an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that, in the embodiments of this application, "B corresponding to A" indicates that B is associated with A, and B may be determined based on A. However, it should further be understood that, determining B based on A does not mean that B is determined merely based on A, and B may also be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing generally describes compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

With descriptions of the foregoing implementation, a person skilled in the art may clearly understand that this application may be implemented by hardware, firmware, or a combination thereof. When this application is implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a computer. The following provides an example but does not impose a limitation. The computer readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer readable medium. For example, if software is transmitted from a website, a server or another remote source by using a coaxial cable, an optical fiber cable, a twisted pair, a digital subscriber line (DSL), or wireless technologies such as infrared ray, radio, and microwave, the coaxial cable, the optical fiber cable, the twisted pair, the DSL, or the wireless technologies such as the infrared ray, the radio, and the microwave are included in a definition of a medium to which they belong. For example, a disk used in this application includes a compact disc (CD), a laser disc, an optical disc, a digital versatile disc (DVD), a floppy disk, and a Blu-ray disc, where the disk generally copies data in a magnetic manner, and the disc copies data optically in a laser manner. The foregoing combination should also be included in the protection scope of the computer readable medium.

In conclusion, the foregoing descriptions are merely embodiments of the technical solutions of this application, and are not intended to limit the protection scope of this application. Any modification, equivalent replacement, improvement, or the like made within the spirit and principle of this application shall fall within the protection scope of this application.

What is claimed is:

1. A method comprising:
receiving, by a terminal device, a physical downlink control channel (PDCCH) order that triggers the terminal device to perform a non-contention based random access procedure, the PDCCH order having a first demodulation reference signal (DM-RS) antenna port property, and the PDCCH order comprising a first synchronization signal block (SSB) index and indicating a first preamble; and
sending, by the terminal device, the first preamble indicated by the PDCCH order via a physical random access channel (PRACH) in the non-contention based random access procedure in response to receipt of the PDCCH order by sending the first preamble on a first random access channel (RACH) resource, wherein the first RACH resource has a correspondence with the first SSB index; and
receiving, by the terminal device, a PDCCH in a scenario where a transmit beam of the PDCCH order is different from a transmit beam of a first SSB of the first SSB index, and in response to sending the first preamble on the first RACH resource corresponding to the first SSB index, the PDCCH having a second DM-RS antenna port property that has a quasi co-location (QCL) relationship with the first DM-RS antenna port property, and the PDCCH scheduling a message 2 (MSG 2) to be received by the terminal device.

2. The method according to claim 1, further comprising:
receiving, by the terminal device, the MSG 2, wherein the MSG 2 and the PDCCH order have same DM-RS antenna port quasi co-location properties.

3. The method according to claim 1, further comprising:
receiving, by the terminal device, indication information, wherein the indication information indicates at least one correspondence between at least one SSB index and at least one RACH resource, and the at least one SSB index comprises the first SSB index that is comprised in the PDCCH order.

4. The method according to claim 3, wherein the indication information is carried in a system information block 1 (SIB 1).

5. The method according to claim 3, wherein the at least one RACH resource comprises the first RACH resource corresponding to the first SSB index.

6. The method according to claim 1, wherein that the second DM-RS antenna port property has the QCL relationship with the first DM-RS antenna port property comprises:
a first large-scale channel property corresponding to an antenna port of a DM-RS of the PDCCH order is correlated to a second large-scale channel property corresponding to an antenna port of a DM-RS of the PDCCH, the first or second large-scale channel property comprising one or more of a delay spread, a Doppler spread, a Doppler shift, an average gain, an average delay, or a spatial reception parameter.

7. The method according to claim 1, wherein the transmit beam of the PDCCH order is same as a transmit beam of the PDCCH.

8. An apparatus comprising:
a non-transitory memory storage comprising instructions; and
one or more processors coupled to the memory storage, wherein the one or more processors execute the instructions to cause the apparatus to perform steps of:
receiving a physical downlink control channel (PDCCH) order that triggers the apparatus to perform a non-contention based random access procedure, the PDCCH order having a first demodulation reference signal (DM-RS) antenna port property and the PDCCH order comprising a first SSB index and indicating a first preamble; and
sending the first preamble indicated by the PDCCH order via a physical random access channel (PRACH) in the non-contention based random access procedure in response to receipt of the PDCCH order by sending the first preamble on a first random access channel (RACH) resource, wherein the first RACH resource has a correspondence with the first SSB index; and
receiving a PDCCH in a scenario where a transmit beam of the PDCCH order is different from a transmit beam of a first SSB of the first SSB index in response to sending the first preamble on the first RACH resource corresponding to the first SSB index, the PDCCH having a second DM-RS antenna port property that has a quasi co-location (QCL) relationship with the first DM-RS antenna port property, and the PDCCH scheduling a message 2 (MSG 2) to be received by the apparatus.

9. The apparatus according to claim 8, wherein the one or more processors execute the instructions to further cause the apparatus to perform:
receiving the MSG 2, wherein the MSG 2 and the PDCCH order have same DM-RS antenna port quasi co-location properties.

10. The apparatus according to claim 8, the one or more processors execute the instructions to further cause the apparatus to perform:
receiving indication information, wherein the indication information indicates at least one correspondence between at least one SSB index and at least one RACH resource, and the at least one SSB index comprises the first SSB index that is comprised in the PDCCH order.

11. The apparatus according to claim 10, wherein the indication information is carried in a system information block 1 (SIB 1).

12. The apparatus according to claim 11, wherein the at least one RACH resource comprises the first RACH resource corresponding to the first SSB index.

13. The apparatus according to claim 8, wherein that the second DM-RS antenna port property has the QCL relationship with the first DM-RS antenna port property comprises:
a first large-scale channel property corresponding to an antenna port of a DM-RS of the PDCCH order is correlated to a second large-scale channel property corresponding to an antenna port of a DM-RS of the PDCCH, the first or second large-scale channel property comprising one or more of a delay spread, a Doppler spread, a Doppler shift, an average gain, an average delay, or a spatial reception parameter.

14. The apparatus according to claim 13, wherein receiving the PDCCH comprises determining a first spatial reception parameter, for receiving the PDCCH, based on a second spatial reception parameter of the PDCCH order, and receiving the PDCCH based on the first spatial reception parameter.

15. The apparatus according to claim 8, wherein the transmit beam of the PDCCH order is same as a transmit beam of the PDCCH.

16. A non-transitory computer-readable media storing computer instructions, that when executed by one or more processors, cause the one or more processors to perform steps of:
receiving a physical downlink control channel (PDCCH) order that triggers an apparatus comprising the one or more processors to perform a non-contention based random access procedure, the PDCCH order having a first demodulation reference signal (DM-RS) antenna port property and the PDCCH order comprising a first SSB index and indicating a first preamble; and
sending the first preamble indicated by the PDCCH order via a physical random access channel (PRACH) in the non-contention based random access procedure in response to receipt of the PDCCH order by sending the first preamble on a first random access channel (RACH) resource, the first RACH resource has a correspondence with the first SSB index; and
receiving a PDCCH in a scenario where a transmit beam of the PDCCH order is different from a transmit beam of a first SSB of the first SSB index in response to sending the first preamble on the first RACH resource corresponding to the first SSB index, the PDCCH having a second DM-RS antenna port property that has a quasi co-location (QCL) relationship with the first DM-RS antenna port property, and the PDCCH scheduling a message 2 (MSG 2) to be received by the apparatus.

17. A method comprising:
sending, by a network device, a physical downlink control channel (PDCCH) order that triggers a terminal device to perform a non-contention based random access procedure, the PDCCH order having a first demodulation reference signal (DM-RS) antenna port property and the PDCCH order comprising a first synchronization signal block (SSB) index and indicating a first preamble; and
receiving, by the network device from the terminal device, the first preamble indicated by the PDCCH order via a physical random access channel (PRACH) in the non-contention based random access procedure, wherein the first preamble is received on a first random access channel (RACH) resource that has a correspondence with the first SSB index; and
sending, by the network device, a PDCCH in a scenario where a transmit beam of the PDCCH order is different from a transmit beam of a first SSB of the first SSB index in response to receiving the first preamble on the first RACH resource corresponding to the first SSB index, the PDCCH having a second DM-RS antenna port property that has a quasi co-location (QCL) relationship with the first DM-RS antenna port property, and the PDCCH scheduling a message 2 (MSG 2) to be sent by the network device to the terminal device.

18. The method according to claim 17, further comprising:
sending, by the network device, the MSG 2, wherein the MSG 2 and the PDCCH order have same DM-RS antenna port quasi co-location properties.

19. The method according to claim 17, further comprising:
sending, by the network device, indication information, wherein the indication information indicates at least one correspondence between at least one SSB index and at least one RACH resource, and the at least one SSB index comprises the first SSB index that is comprised in the PDCCH order.

20. The method according to claim 19, wherein the indication information is carried in a system information block 1 (SIB 1).

21. The method according to claim 19, wherein the at least one RACH resource comprises the first RACH resource corresponding to the first SSB index.

22. The method according to claim 17, wherein that the second DM-RS antenna port property has the QCL relationship with the first DM-RS antenna port property comprises:
a first large-scale channel property corresponding to an antenna port of a DM-RS of the PDCCH order is correlated to a second large-scale channel property corresponding to an antenna port of a DM-RS of the PDCCH, the first or second large-scale channel property comprising one or more of a delay spread, a Doppler spread, a Doppler shift, an average gain, an average delay, or a spatial transmit parameter.

23. The method according to claim 17, wherein the transmit beam of the PDCCH order is same as a transmit beam of the PDCCH.

24. An apparatus comprising:
a non-transitory memory storage comprising instructions; and one or more processors coupled to the memory storage, wherein the one or more processors execute the instructions to cause the apparatus to perform steps of:

sending a physical downlink control channel (PDCCH) order that triggers a terminal device to perform a non-contention based random access procedure, the PDCCH order having a first demodulation reference signal (DM-RS) antenna port property and the PDCCH order comprising a first synchronization signal block (SSB) index and indicating a first preamble; and receiving, from the terminal device, the first preamble indicated by the PDCCH order via a physical random access channel (PRACH) in the non-contention based random access procedure, wherein the first preamble is received on a first random access channel (RACH) resource that has a correspondence with the first SSB index; and sending a PDCCH in a scenario where a transmit beam of the PDCCH order is different from a transmit beam of a first SSB of the first SSB index in response to receiving the first preamble on the first RACH resource corresponding to the first SSB index, the PDCCH having a second DM-RS antenna port property that has a quasi co-location (QCL) relationship with the first DM-RS antenna port property, and the PDCCH scheduling a message 2 (MSG 2) to be sent by the apparatus to the terminal device.

25. The apparatus according to claim 24, wherein the one or more processors execute the instructions to further cause the apparatus to perform:

sending the MSG 2, wherein the MSG 2 and the PDCCH order have same DM-RS antenna port quasi co-location properties.

26. The apparatus according to claim 24, the one or more processors execute the instructions to further cause the apparatus to perform:

sending indication information, wherein the indication information indicates at least one correspondence between at least one SSB index and at least one RACH resource, and the at least one SSB index comprises the first SSB index that is comprised in the PDCCH order.

27. The apparatus according to claim 26, wherein the indication information is carried in a system information block 1 (SIB 1).

28. The apparatus according to claim 26, wherein the at least one RACH resource comprises the first RACH resource corresponding to the first SSB index.

29. The apparatus according to claim 24, wherein that the second DM-RS antenna port property has the QCL relationship with the first DM-RS antenna port property comprises:

a first large-scale channel property corresponding to an antenna port of a DM-RS of the PDCCH order is correlated to a second large-scale channel property corresponding to an antenna port of a DM-RS of the PDCCH, the first or second large-scale channel property comprising one or more of a delay spread, a Doppler spread, a Doppler shift, an average gain, an average delay, or a spatial transmit parameter.

30. The apparatus according to claim 24, wherein the transmit beam of the PDCCH order is same as a transmit beam of the PDCCH.

31. A non-transitory computer-readable media storing computer instructions, that when executed by one or more processors, cause the one or more processors to perform steps of:

sending a physical downlink control channel (PDCCH) order that triggers a terminal device to perform a non-contention based random access procedure, the PDCCH order having a first demodulation reference signal (DM-RS) antenna port property and the PDCCH order comprising a first synchronization signal block (SSB) index and indicating a first preamble; and receiving, from the terminal device, the first preamble indicated by the PDCCH order via a physical random access channel (PRACH) in the non-contention based random access procedure, wherein the first preamble is received on a first random access channel (RACH) resource that has a correspondence with the first SSB index; and sending a PDCCH in a scenario where a transmit beam of the PDCCH order is different from a transmit beam of a first SSB of the first SSB index in response to receiving the first preamble on the first RACH resource corresponding to the first SSB index, the PDCCH having a second DM-RS antenna port property that has a quasi co-location (QCL) relationship with the first DM-RS antenna port property, and the PDCCH scheduling a message 2 (MSG 2) to be sent to the terminal device.

32. A communications system, comprising a terminal device and a network device, wherein the network device is configured to: send a physical downlink control channel (PDCCH) order that triggers the terminal device to perform a non-contention based random access procedure, the PDCCH order having a first demodulation reference signal (DM-RS) antenna port property and the PDCCH order comprising a first synchronization signal block (SSB) index and indicating a first preamble; receive, from the terminal device, the first preamble indicated by the PDCCH order via a physical random access channel (PRACH) in the non-contention based random access procedure, wherein the first preamble is received on a first random access channel (RACH) resource that has a correspondence with the first SSB index; and send a PDCCH in a scenario where a transmit beam of the PDCCH order is different from a transmit beam of a first SSB of the first SSB index in response to receiving the first preamble on the first RACH resource corresponding to the first SSB index, the PDCCH having a second DM-RS antenna port property that has a quasi co-location (QCL) relationship with the first DM-RS antenna port property, and the PDCCH scheduling a message 2 (MSG 2) to be sent by the network device to the terminal device; and wherein the terminal device is configured to: receive the PDCCH order that triggers the terminal device to perform the non-contention based random access procedure; send the first preamble in the non-contention based random access procedure in response to receipt of the PDCCH order by sending the first preamble on the first RACH resource; and receive the PDCCH in the scenario where the transmit beam of the PDCCH order is different from the transmit beam of the first SSB of the first SSB index in response to sending the first preamble on the first RACH resource corresponding to the first SSB index.

* * * * *